United States Patent [19]
Graham et al.

[11] Patent Number: 5,828,006
[45] Date of Patent: Oct. 27, 1998

[54] BUSWAY SYSTEM WITH WEDGE BRACE SUPPORTS

[75] Inventors: Eric J. Graham, Farmington, Conn.; Clarence W. Walker, Selmer, Tenn.; Louis A. Rosen, Wallingford, Conn.; Steven E. Richard, Selmer, Tenn.

[73] Assignee: General Electric Company, New York, N.Y.

[21] Appl. No.: 734,161

[22] Filed: Oct. 21, 1996

[51] Int. Cl.[6] .................................................. H02G 5/06
[52] U.S. Cl. ........................................ 174/99 R; 361/675
[58] Field of Search ................................ 174/99 R, 99 B, 174/68.2, 16.2, 72 R, 72 B, 88 R, 88 B, 70 B, 71 B, 133 B; 361/611, 675; 439/110, 207, 794, 115, 116, 119, 210, 212, 213, 214

[56] References Cited

U.S. PATENT DOCUMENTS

| | | | |
|---|---|---|---|
| 2,218,016 | 10/1940 | Anderson | 439/794 |
| 3,315,132 | 4/1967 | Lucas | 361/829 |
| 4,673,229 | 6/1987 | Jorgensen et al. | 439/207 |
| 4,804,804 | 2/1989 | Hibbert et al. | 174/16.2 |
| 4,929,801 | 5/1990 | Hibbert | 174/16.2 |

FOREIGN PATENT DOCUMENTS

| | | | |
|---|---|---|---|
| 925971 | 5/1973 | Canada | 174/99 B |

*Primary Examiner*—Kristine L. Kincaid
*Assistant Examiner*—Joseph Waks
*Attorney, Agent, or Firm*—Richard A. Menelly; Carl B. Horton

[57] ABSTRACT

An electric power busway system has multi-phase power bus bar conductors that are each housed within an individual duct. Individually housing the bus bar conductors provides short-circuit bending resistance as well as superior thermal heat dissipation characteristics because of the improved conductive heat transfer between the bus bar conductors to the individual housing, as well as convective heat transfer from the individual housing assemblies into the ambient air. Wedge-type support braces retain each housed bus bar in position and provide short circuit support.

16 Claims, 4 Drawing Sheets

BUSWAY SYSTEM WITH WEDGE BRACE SUPPORTS

BACKGROUND OF THE INVENTION

Our invention relates to electric power distribution systems of the type commonly referred to as "busways," which embody enclosed ducts or housings for the multiple bus conductors within. Sections of a power busway used within an electric power distribution system typically consist of several major components including bus bar conductors, a protective duct or housing arrangement, and support frames or clamps.

Busway systems can be subjected to external forces or short-circuit conditions where magnetic repulsion forces are generated between the individual bus bars imposing distortion stresses upon the system. Therefore busway systems must be designed and built to withstand such external forces or vibrations caused by short-circuit stresses.

Another consideration in the design of busway systems is that the heat load generated within the housing has to be dissipated from the busway system through conductive and convective heat transfer means. Conductive dissipation transfers heat from current carrying bus bars to adjacent housing parts. Convective dissipation transfers heat from the adjacent housing parts to the surrounding air.

Busway systems are typically constructed with the metallic busway housing or "bus duct" closely surrounding the bus conductors as a group. A typical design is for one housing assembly enveloping or surrounding the main phase bus bars within as in U.S. Pat. No. 4,673,229, entitled "Electrical Distribution System with an Improved Housing," which describes a housing construction that facilitates heat dissipation and resists magnetic forces created by high fault currents. The housing assembly is built with reinforcement and multiple fasteners extended along the length of the busway section. The problem with this type of design for one housing assembly surrounding a group of bus bar conductors is that the heat generating bus bars in the center of the busway structure are not allowed to dissipate as much heat as the bus bars adjacent to the sides of the housing structure.

U.S. Pat. No. 4,804,804 entitled "Thermally Efficient Power Busway Housing," provides an improved support housing which partially solves the uneven heat dissipation problem. The housing assembly has hollow steel bolts in the center bolting the bus bars to the housing side plates. The hollow steel bolts promote the flow of air through the interior of the bus bars as well provide intimate thermal transfer between the bus conductors and the heat radiating support structure.

U.S. Pat. No. 4,929,801 entitled "Thermally Efficient Ventilated Electric Busway System" describes a busway system comprising a plurality of apertured electrical bus bars and housing side plates. The apertures provide a path for convective air flow for cooling the interior of the bus bars. The above solutions provide support during short-circuit conditions as well as improve the heat dissipation problem from the center bus bars. However, this type of construction does not work well with small-width bus bars.

A problem often experienced in the design and construction of a busway system is keeping the straight bus bars in their permanent positions in the housing. Bus bars in a busway system are subject to thermal expansion because of the heat generated therein. Because the bus bars undergo different expansion rates as compared to the housing material, they slide or move longitudinally within the housing. To prevent straight bus bars from sliding out of the busway housing, various solutions have been employed. One approach was to bend the straight bus bars to the shape of the formed housing which would not allow the bus bars to escape from the housing assembly. A different approach as in the aforementioned U.S. Pat. No. 4,804,804 and U.S. Pat. No. 4,929,801, which does not work well with small-width bus bars, was to drill holes through the bus bars and busway housing and clamp all the pieces together. Another approach called for separate supporting frames at spaced intervals along the length of the bus bar conductors as in U.S. Pat. No. 3,315,132 entitled "Busbar Power Distribution Systems." U.S. Pat. No. 2,218,016 entitled "Bus Bar Clamp" provided for separate clamps spaced at intervals along the length of the bus bars to clamp the bus bars rigidly together in their permanent positions. All of the above solutions are difficult to install, requiring the use of multiple parts.

OBJECT OF THE INVENTION

It is an object of the present invention to provide a novel and improved busway housing for each individual bus bar conductor within a busway system which is simple and easy to assemble as well as strong enough to keep the bus bars within a relatively fixed position and withstand distortion stresses.

A further object of this invention is to provide a busway housing duct with improved conductive and convective heat transfer characteristics, allowing the bus bars in the center of a multi-phase system to better dissipate heat.

It is another object of this invention to provide a novel clamping mechanism that is simple in construction, whereby the clamps impose a positive contact on the bus bars, keeping them in position.

Further objects and features of the invention will be readily apparent to those skilled in the art from the following specification which includes the appended claims and drawings.

SUMMARY OF THE INVENTION

The invention, accordingly, provides an improved electric power busway system comprising a plurality of bus bars, each individually housed in its own separate metallic housing duct with supporting means spaced at intervals along the length of the housing duct to keep the bus bars in position within the housing duct.

The present invention further provides a support assembly that may be applied to bus bar conductors either enclosed in individual housing ducts according to the instant invention, or in one common housing duct. In its preferred form, the support assembly comprises two metal clamping blocks. Where the clamping blocks are in contact with the two elongated sides of the bus bars and with one another, the blocks are shaped into wedges for co-acting with and applying side pressure on the bus bars. Fasteners extend through the wedge blocks to clamp and further apply pressure on the wedges to hold the bus bars tightly in place.

DESCRIPTION OF THE PREFERRED EMBODIMENT

Figure 1:
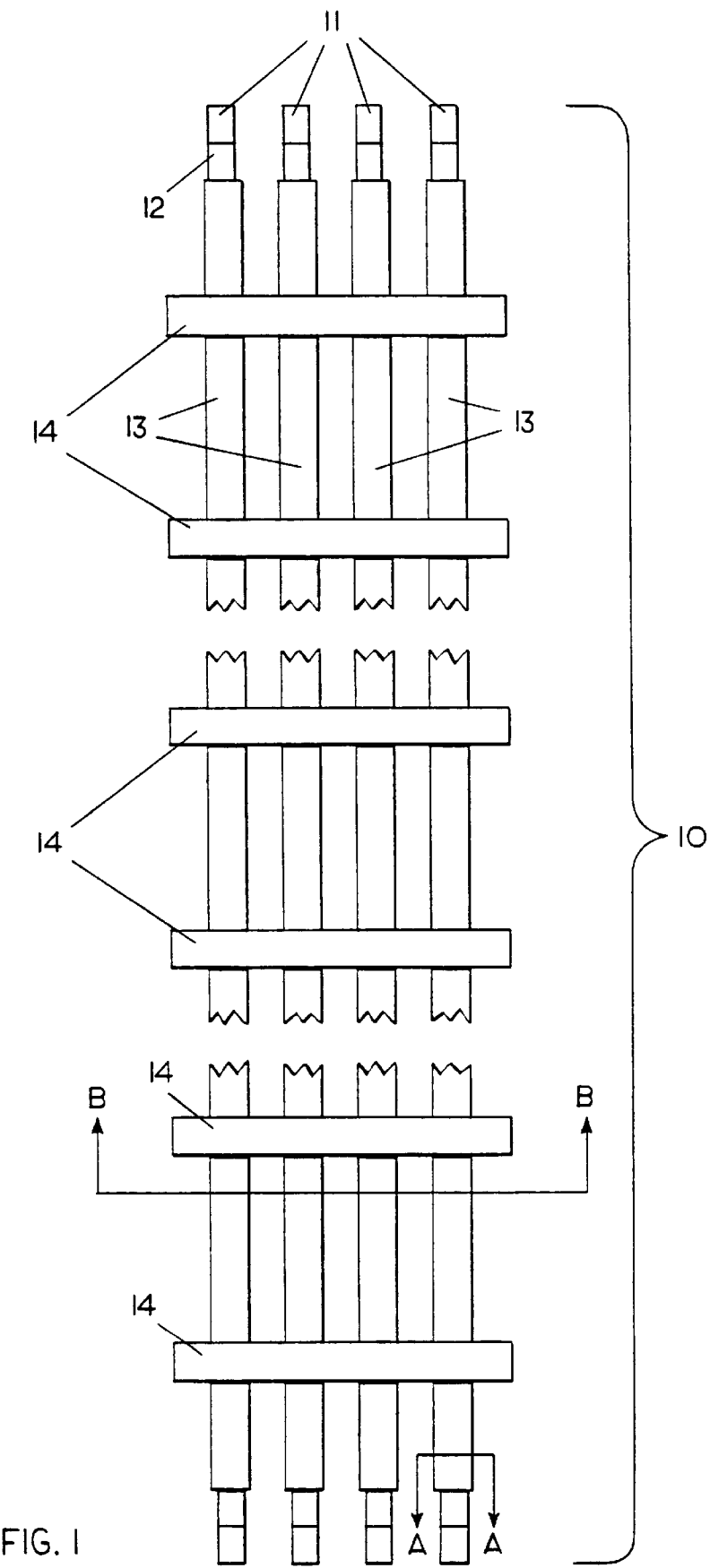
FIG. 1 is a top perspective fragmentary view of a power busway distribution system in accordance with the instant invention.

The busway system according to the invention is shown in FIG. 1 with a busway distribution section 10, comprising of a plurality of bus bar conductors 11, each electrically insulated with an insulator cover 12. Each insulated individual bus bar 11 is enclosed in its own separate housing duct 13. Support means 14 are placed intermittently along the busway section 10 to add structural support and provide stiffness against bending during short-circuit conditions as well as to keep the bus bars from sliding out of the housing assemblies.

Separately housing the bus bars 11 in their own housing ducts 13 significantly increases thermal convection from the busway system to the surrounding air by increasing the conduction to and convection flow from each bus bar conductor. The housing ducts are preferably formed from an aluminum alloy with excellent tensile strength as well as electrical and conducting properties. The support brace assemblies 14 collect and evenly distribute ground currents at regular intervals along the busway for safe distribution of energy under short-circuit conditions.

Figure 2:
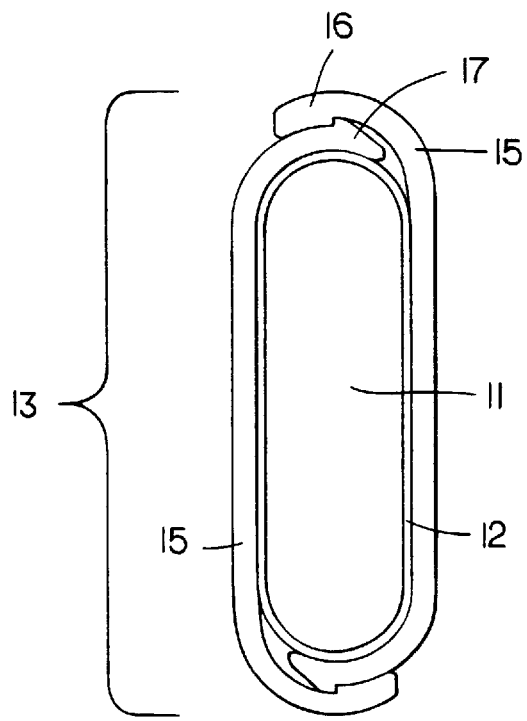
FIG. 2 is a cross sectional view of a bus bar conductor, showing section A—A in FIG. 1.

FIG. 2 is a cross-section of bus bar conductor 11 and its associated housing duct 13, showing section A—A of Fig. 1 in detail. In its preferred form, the housing duct 13 comprises two identical extruded metallic housing parts 15, each assembled in an orientation 180 degrees opposite of the other part. Each metallic housing part 15 has a male end 17 and a female end 16 which snap fit together during assembly to prevent the duct assembly from being dismantled. The bus bar housing ducts 13 are shaped to snugly enclose the bus bar conductors 11 within. The bus bar conductors 11 are insulated with a thin layer of insulation preferably epoxy, to separate the live conductors 11 from the protective housing ducts 13.

Figure 3:
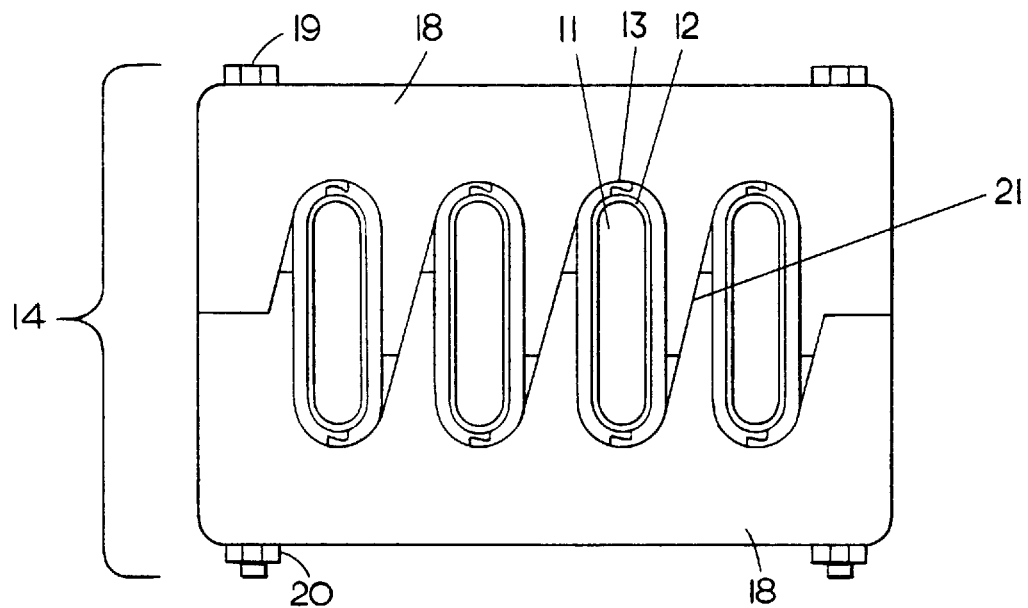
FIG. 3 is a cross sectional view of wedge brace support, showing section B—B in Figure 1.

FIG. 3 is a cross section of the busway section 10 at the support assembly 14. In its preferred form, the support assembly 14 is in the form of brace clamps (section B—B in Figure). The support brace clamps comprise two identical support blocks 18, each block assembled in an orientation 180 degrees opposite of the other block. The two blocks are assembled about and shaped to mate with the electrically insulated multi-phase bus bars 11 enclosed within the housing duct 13. Where the blocks are in contact with the two opposite rounded edges of the bus bar 11 and the enclosing housing enclosure 13, the blocks are shaped into troughs. Where the blocks are in contact with the two elongated sides of the bus bar and mating housing enclosure, the troughs extend to wedges. Fasteners such as through-bolts 19 extend through the wedge blocks 18 and are locked by lock nuts 20. The wedge blocks 18 firmly capture the bus bars and housing assemblies when the through-bolts 19 are torqued to their required specification. As the fasteners directly clamp and apply pressure on the wedges, the sharp angles 21 on the wedge block mating surfaces in turn apply friction and side pressure on the bus bar and housing assembly within, squeezing them together to hold the bus bars tightly in place.

Figure 5:
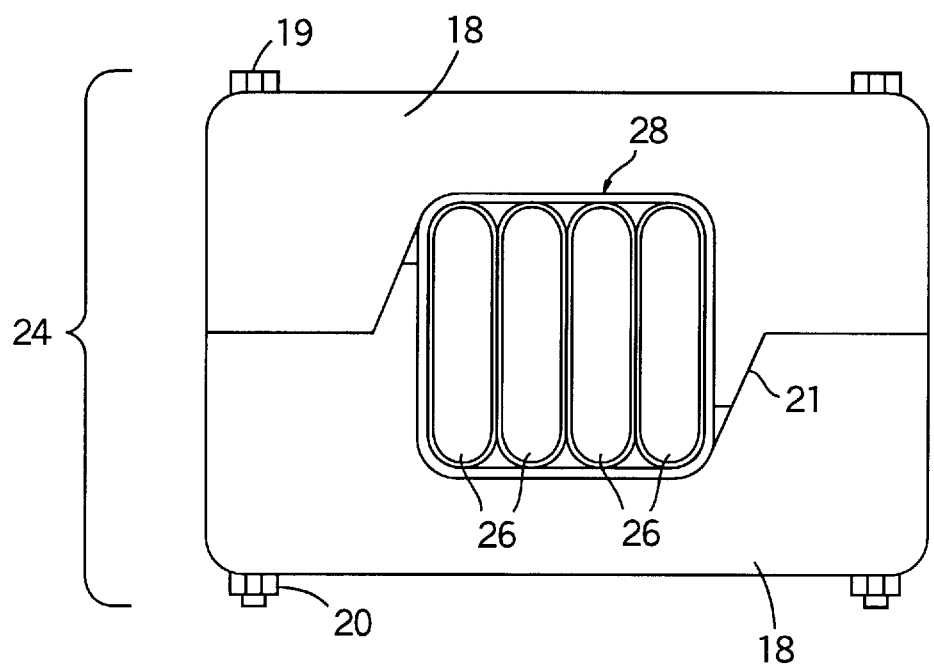
FIG. 5 is a front elevational view of another embodiment of a wedge brace support in accordance with the instant invention.

As will be understood by those skilled in the art, various forms of support assembly may be used to support the bus bar conductors enclosed in individual housing assemblies of the instant invention. For example, the support assembly for the individually housed bus bar conductors may be in the form of clamping blocks, brackets, or braces, held together by various means of mechanical fasteners. Further, although the support brace clamp 14 of the instant invention is shown to provide support to the bus bar Conductors enclosed in individual housing assemblies as in FIG. 3, a brace clamp 24 in FIG. 5 constructed in accordance with the instant invention may also be used to provide support to the bus bar conductors 26 in a conventional busway system with one housing assembly enveloping all bus bars 26.

Figure 4:
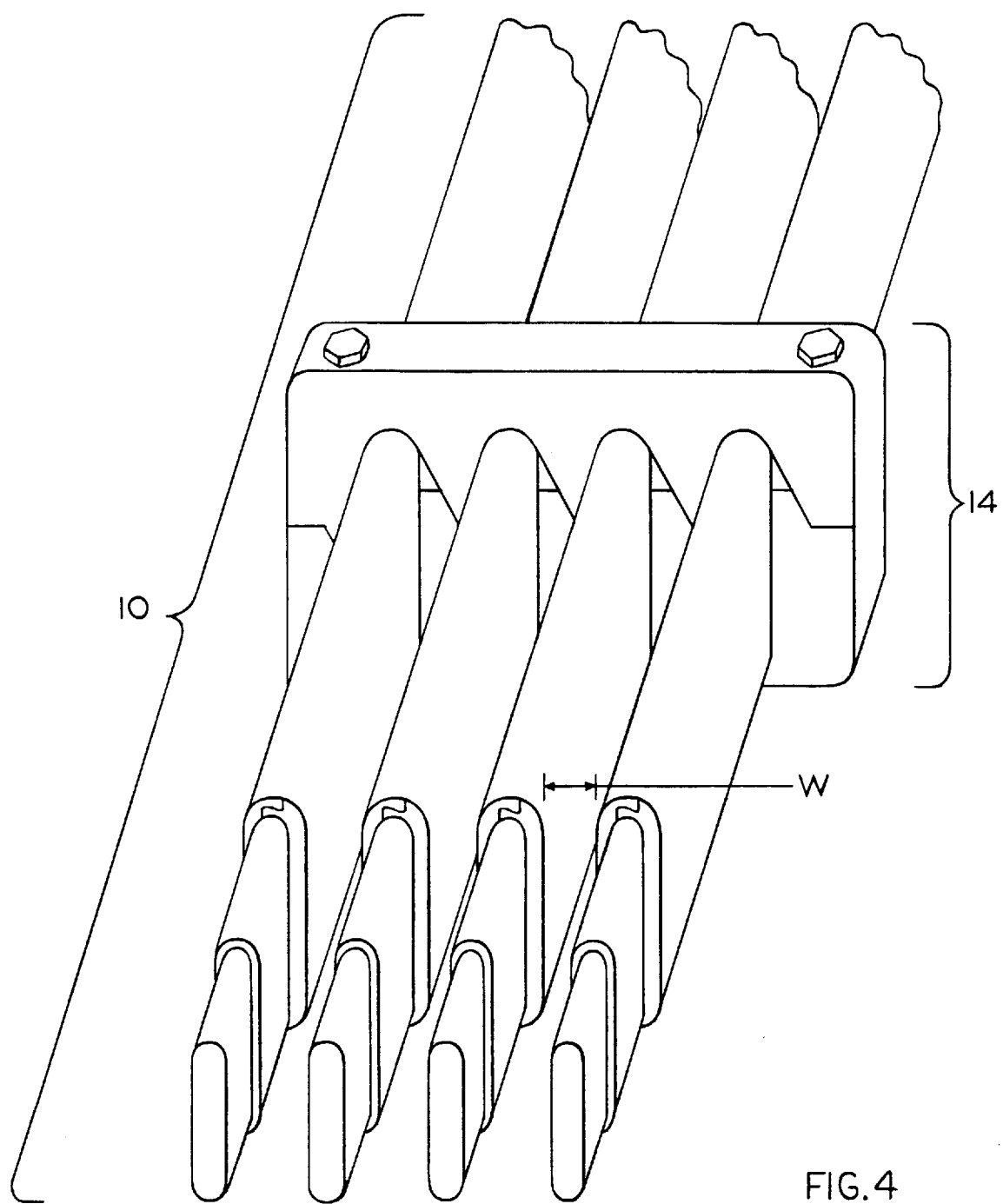
FIG. 4 is an isometric fragmentary view of the power busway distribution system in accordance with the instant invention.

FIG. 4 is a fragmentary view of the end section of a feeder type busway section 10 with a support brace clamp 14 placed close to the end of the busway, and the bus bar conductors 11 in their respective housing ducts being physically separated from one another. The existence of the gap W between each bus bar and bus duct assembly provides an increased amount of convective cooling from the bus bar conductors to the ambient surroundings. In heat tests comparing the busway system of the instant invention containing individually housed bus bar conductors with the conventional busway systems with a metallic housing surrounding the bus bar conductors as a group the busway system of the instant invention has been shown to dissipate heat away from the system at a rate ranging up to 35% faster than a conventional busway system.

What is claimed is:

1. An electric power busway system comprising:

a plurality of electrically insulated power bus bars;

a plurality of metallic housing ducts; each of said housing ducts enclosing snugly a substantial length of one of said bus bars; and braces spaced at intervals along the length of said plurality of bus bars and said plurality of housing ducts to retain said bus bars in position within said housing ducts.

2. The busway system of claim 1, wherein:

each of said housing ducts comprises a first housing part and a second housing part having longitudinal edges, said edges of said first housing part being secured to said edges of said second housing part to enclose said housing parts about one of said bus bars.

3. The busway system of claim 2, wherein:

said edges of said first and second housing parts comprise a snap interlock fitting arrangement wherein on of said edges of said first housing part is a male end and one edge of said second housing part is a female end which snap fit together.

4. The busway system of claim 1, wherein said first and second housing parts are extruded.

5. The busway system of claim 1, wherein said first and second housing parts are comprised of non-ferrous metals.

6. The busway system of claim 1, wherein said non-ferrous metals comprise aluminum alloy.

7. The busway system of claim 1, wherein said braces maintain each of said housing ducts in spaced relationship to each other.

8. The busway system of claim 7, wherein at least one of said braces comprises a first clamping block, a second clamping block, and at least one fastener for clamping said first and second clamping blocks together; said first and second clamping blocks having opposing complementary wedge-shaped portions that when clamped together define channels for recieving and retaining said housing ducts and said bus bars.

9. The busway system of claim 8, wherein said opposing complementary wedge-shaped portions provide co-acting engagement therebetween to apply said pressure to each of said housing ducts to retain said bus bars in position to each of said housing ducts when said first and second clamping blocks are clamped together.

10. The busway system of claim 1, wherein each of said insulated bus bars are insulated by an epoxy.

11. An electric power busway system comprising:

at least one housing duct of a metallic construction;

a plurality of insulated power bus bars disposed within said housing duct; and a brace for retaining said bus bars within said housing duct, said brace comprising a pair of opposing first and second clamping blocks and at least one fastener for applying pressure on said clamping blocks to clamp them together, said first and second clamping blocks having opposing complementary wedge-shaped portions that when clamped together define at least one channel for receiving and retaining said housing duct and said bus bars whereby said opposing complementary wedge-shaped portions provide co-acting engagement therebetween to engage and apply side pressure to said housing duct to retain said bus bars in position to said housing duct when said first and second clamping blocks are clamped together.

12. The busway system of claim 10, wherein said housing duct is extruded.

13. The busway system of claim 11, wherein said housing duct is comprised of non-ferrous metals.

14. The busway system of claim 11, wherein said non-ferrous metals comprise aluminum alloy.

15. A method for increasing the heat removal rate from electrical busway systems comprising a plurality of electrically insulated power bus bars while providing short circuit bending resistance for said bus bars, said method comprising:

enclosing each of said electrically insulated power bus bars individually in its own metallic housing duct, each of said housing ducts enclosing snugly a substantial length of each of said bus bars; and retaining each of said insulated bus bars within each of said metallic housing ducts by braces placed at intervals along the length of said bus bars.

16. An electric power busway system comprising:

a plurality of electrically insulated power bus bars;

a plurality of metallic housing ducts; each of said housing ducts covering a portion of one of each bus bars housed within; and a brace for retaining said bus bars within said housing ducts, said brace comprising a pair of opposing first and second clamping blocks and at least one fastener for applying pressure on said clamping blocks to clamp them together, said first and second clamping blocks having opposing complementary wedge-shaped portions that when clamped together define at least one channel for recieving and retaining said housing duct and said bus bar whereby said opposing complementary wedge-shaped portions provide co-acting engagement therebetween to engage and apply side pressure to said housing duct to retain said bus bars in position to said housing duct when said first and second clamping blocks are clamped together.

* * * * *